Aug. 14, 1962 HIDEO MIYAUCHI 3,049,048
FADING MECHANISM FOR CAMERA
Filed Nov. 12, 1959 4 Sheets-Sheet 1

INVENTOR
HIDEO MIYAUCHI
By *Stanley Wald*

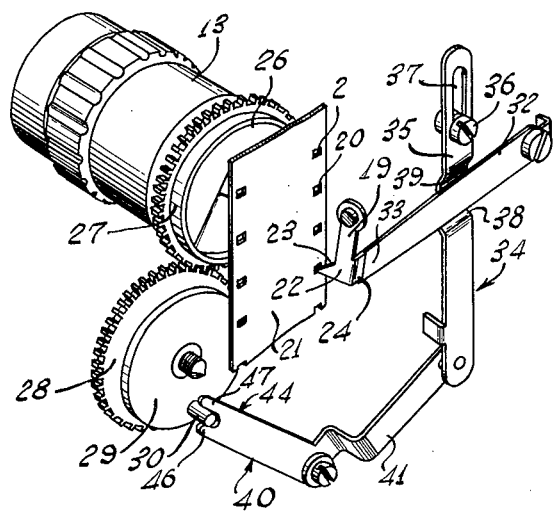
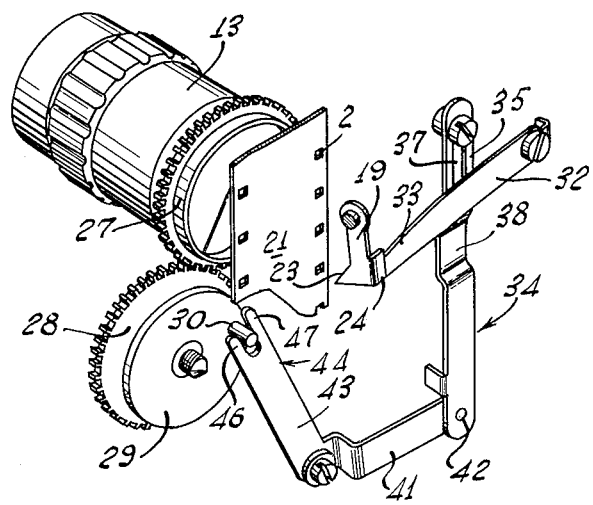
INVENTOR
HIDEO MIYAUCHI
By Stanley Welder Aug. 14, 1962   HIDEO MIYAUCHI   3,049,048
FADING MECHANISM FOR CAMERA
Filed Nov. 12, 1959   4 Sheets-Sheet 3
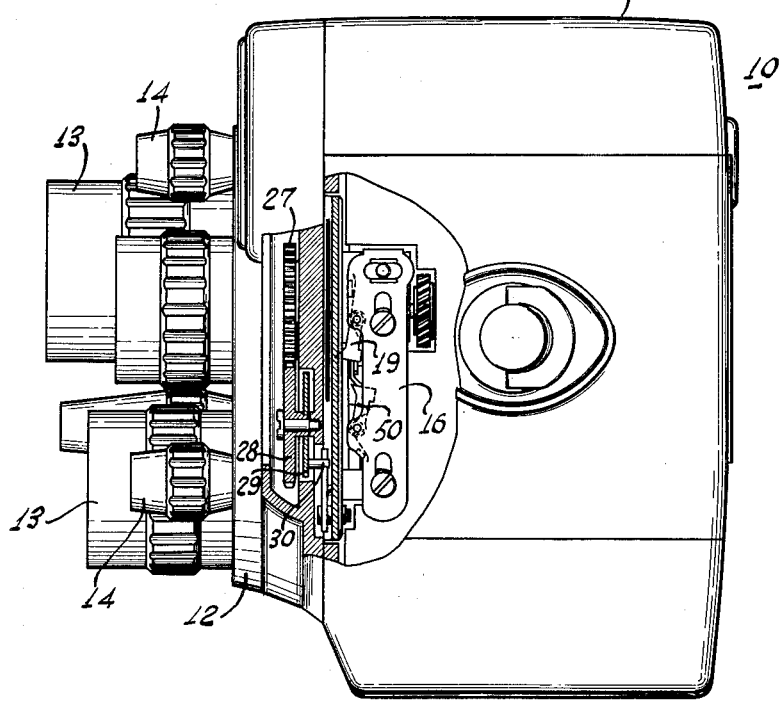
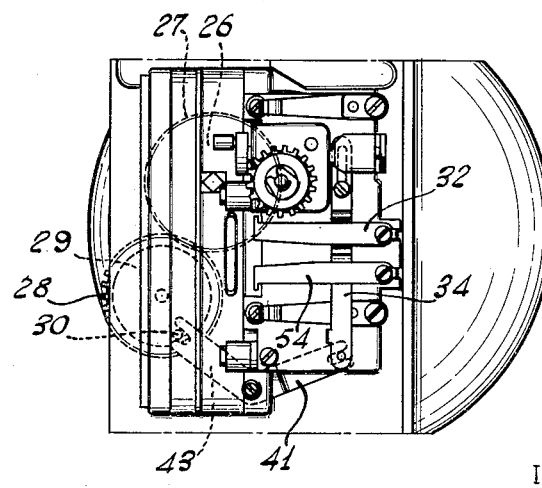
INVENTOR
HIDEO MIYAUCHI
By Stanley Walder INVENTOR
HIDEO MIYAUCHI
By Stanley Welds

United States Patent Office  3,049,048
Patented Aug. 14, 1962

3,049,048
FADING MECHANISM FOR CAMERA
Hideo Miyauchi, Okaya-shi, Nagano-ken, Japan, assignor to Yashica Co., Ltd., Tokyo, Japan, a corporation of Japan
Filed Nov. 12, 1959, Ser. No. 852,521
Claims priority, application Japan Dec. 19, 1958
10 Claims. (Cl. 88—16)

The present invention relates generally to improvements in motion picture cameras and it relates more particularly to a motion picture camera having an improved mechanism for the production of fading sequences.

In the projection and viewing of motion pictures an abrupt transition from one picture sequence to a successive picture sequence is usually undesirable and unattractive. It has therefore been a common practice to terminate a motion picture sequence with a fade-out, that is a gradual decrease in the picture brightness to total or partial darkness and to initiate the next successive motion picture sequence with a fade-in, that is a gradual increase in the picture brightness to normal. It is also a common practice to overlap a fade-out sequence with the next successive fade-in sequence to effect a gradual transition from one motion picture sequence to the next successive motion picture sequence and in the absence of any total darkness period. These fading and overlapping sequences, are obtained by correspondingly varying the light entering the camera during such sequences by the proper control of the camera lens diaphragm. The necessary correlation of the lens diaphragm and the camera drive to obtain optimum results requires experience and training normally not possessed by the amateur. As a consequence, the camera is usually permitted to continue its operation following the closing of the diaphragm in fade-outs or is started too early in fade-ins thereby wasting considerable lengths of film and requiring the cutting and splicing of the film to avoid an inferior projection and viewing. Furthermore, in overlap photography it is necessary to rewind a predetermined length of the exposed film. Not only is this difficult to gauge properly, but requires the manual disabling of the frame advancing mechanism to permit the rewinding of the film and is often accompanied by the tearing of the film sprocket openings and damage to film, interfering with subsequent use thereof.

It is therefore a principal object of the present invention to provide an improved motion picture camera.

Another object of the present invention is to provide an improved motion picture camera provided with means for automatically producing fading sequences.

Still another object of the present invention is to provide an improved motion picture camera provided with a mechanism for automatically producing fade-in, fade-out and overlapping sequences, requiring no training or experience for its proper operation and thus avoiding any film wastage or damage.

A further object of the present invention is to provide an improved motion picture fading mechanism of the above nature characterized by its simplicity, reliability, ruggedness and low cost.

The above and other objects of the present invention will become apparent from a reading of the following description taken in conjunction with the accompanying drawings wherein:

FIGURE 3 is a perspective view of the fade-out mechanism during the fade-out operation;

FIGURE 4 is a perspective view similar to FIGURE 3 at the termination of the fade-out operation;

FIGURE 5 is a side elevational view of another embodiment of the present invention illustrated partially broken away;

FIGURE 6 is a rear elevational view of the fade mechanism thereof;

Figure 1:
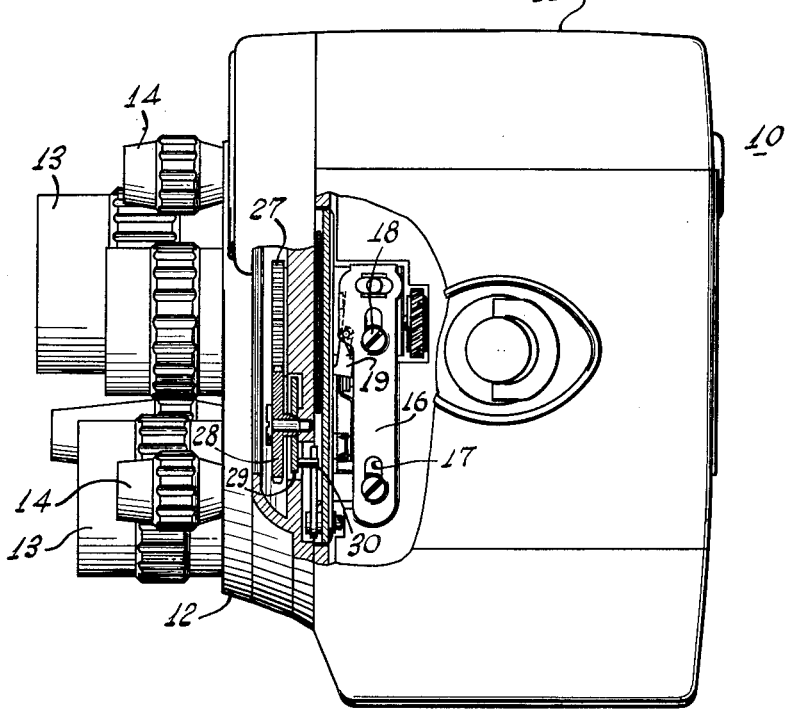
FIGURE 1 is a side elevational view of camera embodying the present invention illustrated partially broken away.
Figure 2:
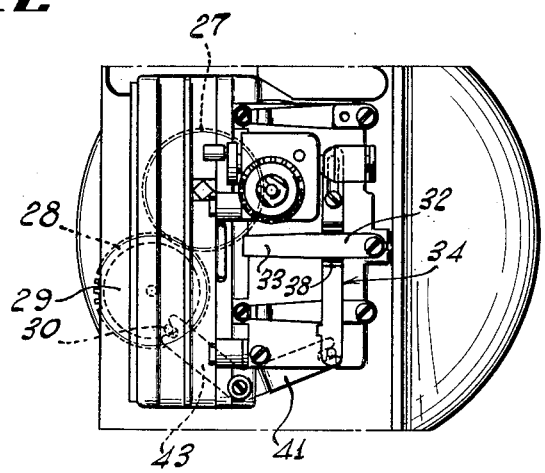
FIGURE 2 is a rear elevational view of the improved fade-out mechanism of the camera.

In a sense the present invention contemplates the provision of an improved motion picture camera comprising a variable aperture diaphragm movable between an open and closed position, a film advancing mechanism and means responsive to the closing of said diaphragm for deactuating said film advancing mechanism. Thus, in effecting a fade-out the operator merely closes the diaphragm aperture at the desired speed, the advance of the film being automatically stopped upon the full closure of the aperture thereby preventing the running of film without exposure and the resulting wasting thereof. A fade-in is produced in an opposite manner by merely opening the diaphragm from its closed position, the film advance being initiated only upon the opening of the diaphragm. Overlap photography may be simply achieved by rewinding the film for the interval of the fade-out sequence and initiating the following sequence by a fade-in. In accordance with an alternative form the present invention in addition to deactuating the forward film advancing mechanism upon the closure of the diaphragm aperture the reverse film advancing mechanism is actuated thereby facilitating overlap photography. According to the preferred form of the present invention the camera advancing mechanism includes at least one film frame advancing element or pawl swingable into and out of engagement with the film and means for locking the pawl in a retracted film disengage position upon the closure of the diaphragm aperture.

Referring now to the drawings and more particular to FIGURES 1 to 4 thereof which illustrate a preferred embodiment of the present invention the reference numeral 10 generally designates a turret type motion picture camera provided with the improved fade producing mechanism and of conventional construction except as hereinafter set forth. The camera 10 includes a casing 11 provided with a turret 12 carrying picture taking lenses 13 and matching viewing lenses 14 which are selectively movable into operable position. The camera 10 is provided with the usual spindle mounted film feed and take-up reels or spools which are friction driven by a conventional spring wound motor to selectively wind the film in a forward or reverse direction. The camera motor also synchronously drives the shutter and the film frame advancing mechanism in any well known manner.

The film frame advancing mechanism includes a vertical bar 16 having longitudinal slots 17 formed therein which slidably engage a pair of screws 18 to limit the bar to a vertical reciprocating motion which is imparted thereto by the camera motor. A film advancing element or pawl 19 rockably depends from the upper part of the bar 16 being pin mounted thereon and swingable between a forward position engaging a sprocket opening 20 of the film 21 and a retracted position out of engagement with the film 21 and being normally spring urged to a forward film engaging position. The pawl 19 terminates at its lower end with a forwardly directed hook portion 22 having an upper inclined edge 23 and a flat bottom edge whereby to define a forwardly sensed pawl. Thus upon downward movement of the bar 16 the pawl 19 engages a film sprocket opening 20 to advance the film 21 a frame increment and upon upward movement of the bar 19 the pawl disengages the sprocket opening 20 and moves into registry with the next successive opening 20. The film 21 is guided along a predetermined path in the usual manner and the conventional film engaging frictional means are provided which allows the advance of the film only by the pawl 19 and prevents film take-up by the winding reel when the film is not so advanced by the pawl 19. In order to facilitate the locking of the pawl 19 in a retracted position a laterally projecting ear or lug 24 is located at the lower rear edge of the pawl 19.

Located forwardly of the path of the film 21 and along the optical axis of a lens 13 in operable position, is a variable aperture iris type diaphragm 26 provided with an externally toothed gear defining control ring 27. The diaphragm 26 is so sensed that clockwise rotation of the gear ring 27 closes the diaphragm 26 and counterclockwise rotation thereof opens the diaphragm aperture. Furthermore, the diaphragm 26 is preferably of a type which permits further movement thereof in a closing direction following the full closure of the diaphragm aperture with a corresponding clockwise movement of the gear ring 27. A second gear 28 is suitably rotatably mounted in the casing 11 and engages the ring gear 27, the gear 28 having a portion thereof projecting outside the casing 11 to afford ready access thereto and permit easy manipulation thereof by the camera operator during a photographing sequence. Coaxially affixed to an end face of the gear 28 is a disc 29 which carries a longitudinally projecting eccentrically mounted pin 30.

In order to releasably lock the pawl 19 in a retracted position and stop the advance of the film 21 upon the closing of the diaphragm 26 there is provided a laterally extending cantilevered resilient arm 32 having one end thereof affixed to the body of the camera 10 and having a free end 33 forwardly and rearwardly movable and resiliently urged to its forward position. The arm free end 33 engages the pawl lug member 24 for the full reciprocating stroke of the pawl 19 by reason of the disposition and heights of the lug 24 and arm free end 33. Furthermore when the arm free end 33 is in its normal forward position the pawl 19 is free to swing into film engaging position.

A cam defining vertical arm 34 extends across the front face of the resilient arm 32 and is longitudinally slidably supported by a screw 36 registering with an elongated slot 37 formed in the upper part of the arm 34. Also formed in the arm 34 below the slot 37 is a rearwardly concave recess 38 of a greater length than the width of the arm 32 and having an upper inclined cam defining wall or surface 39. When the upper part 35 of the arm 34 engages the arm 32 it swings the forward end 33 thereof rearwardly to lock the pawl 19 in a retracted film disengage position and when the recess 38 registers with the arm 32 the forward end 33 swings forwardly to release the pawl 19 to film engage position.

The arm 34 is coupled to the disc 29 by means of a rockable bell crank 40 having its knee portion suitably pivotly mounted by a screw 41. The bell crank 40 includes a first rearwardly offset arm 41 having a longitudinal slot at its outer end engaging a pin 42 mounted at the lower end of the arm 34 and an upwardly laterally extending arm 43 terminating in a yoke member 44 defined by a short lower leg 46 and a spaced relatively long upper leg 47 which permits releasable engagement thereof by the pin 30 as the diaphragm 26 reaches its aperture closed position. Thus when the aperture 26 is in an open position the pin 29 is out of engagement with the yoke 44 and the bell crank 40 and arms 34 and 32 are in the position illustrated in FIGURE 3 of the drawing, releasing the arm free end 33 to its forward position and the pawl 19 to its film engage position permitting the advance of the film 21. As the diaphragm 26 is closed by rotating gear 28 counterclockwise and control ring 27 clockwise the pin 30 is brought into registry with the yoke 44 as illustrated in FIGURE 3 of the drawing and upon further rotation of the gear 24 to its terminal closed position the pin 30 by way of the yoke 44 rotates the bellcrank 40 clockwise as seen in FIGURE 4 of the drawing, to depress the arms 41 and 34 and urge the resilient arm 33 rearwardly by means of the cam surface 39, out of the recess 38 and upon the rear face of the arm upper section 35. The arm free end 33 engaging the pawl lug 24 thereby brings and maintains the pawl 19 in a retracted film disengage position halting the advance of the film 21. By rotating the gear 28 clockwise the above sequence of operations is reversed, the pawl 19 being released to film engage and advance position and the diaphragm aperture thereafter opened.

In employing the improved camera for producing a fadeout sequence, the picture taking sequence is effected in the normal manner with the diaphragm 26 in an open position and upon the termination thereof the diaphragm 26 is slowly closed at the desired rate by rotating the gear 28 to gradually reduce the light reaching the film 21. Following the closing of the diaphragm aperture, the film advancing pawl 19 is retracted in the manner above set forth to automatically stop the film advance. To effect a fade-in sequence the above procedure is merely reversed, the camera being directed at the subject and the gear 28 rotated clockwise to release the pawl 19 and then slowly open the diaphragm aperture. Where an overlap sequence is desired, the film is rewound, in the usual fashion, following a fade-out sequence, with the aperture closed and for substantially the full length of the fade-out sequence. The closed diaphragm is accompanied by a retracted pawl permitting the simple rewinding of the film 21. The next picture taking sequence is then initiated with a fade-in sequence as aforesaid.

In FIGURES 5 to 8 of the drawings there is illustrated another embodiment of the present invention which facilitates the production of overlap sequences and which differs from the first described embodiment only in the provision of a second reverse advancing pawl and an associated disabling arm and is otherwise substantially identical thereto, similar reference numerals designating corresponding parts. More particularly, the reciprocating bar 16, in addition to the forward advancing pawl 19, carries at its lower end an oppositely sensed film reverse forwardly pawl 50. The pawl 50 is sensed oppositely to the pawl 19 and is pivoted at its lower end to the bar 16, extending upwardly and forwardly therefrom and being spring swung to a forward film engage position. The pawl 50 includes a forwardly directed hook section 51 having a forwardly upwardly inclined under edge 52 and a horizontal upper edge 53 whereby reciprocation of the pawl 50 effects the reverse advance of the film 21 since the sprocket openings 20 are engaged and disengaged by the upward and downward movement respectively of the pawl 50. Associated with the pawl 50 is a second pawl, resilient disabling arm 54 fixed at one end thereof and extending below and parallel to the first disabling arm 32 and having a free end 56 engaging the front face of an ear 57 projecting laterally from the pawl 50. Furthermore, the recess 38 in arm 34 is provided with an inclined lower cam surface 58 extending to the lower section of the arm 34. It should be noted that conventional means are provided which are responsive to the depression of the arm 34 for shifting the camera drive motor from the take up to the rewind reel and upon raising of the arm 34 from the rewind to the take up reel.

Figure 7:
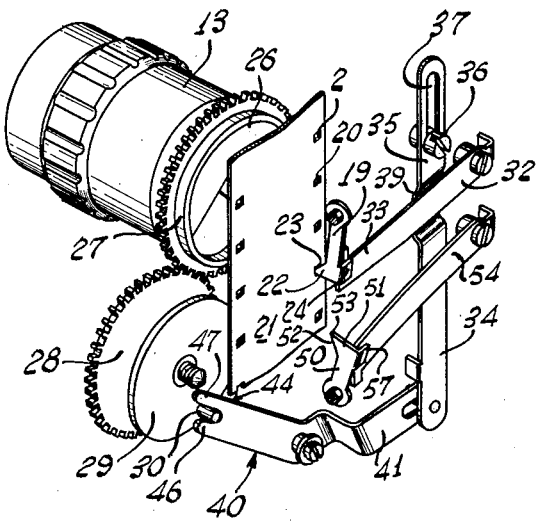
FIGURE 7 is a perspective view of the fade mechanism during the initial actuation thereof.
Figure 8:
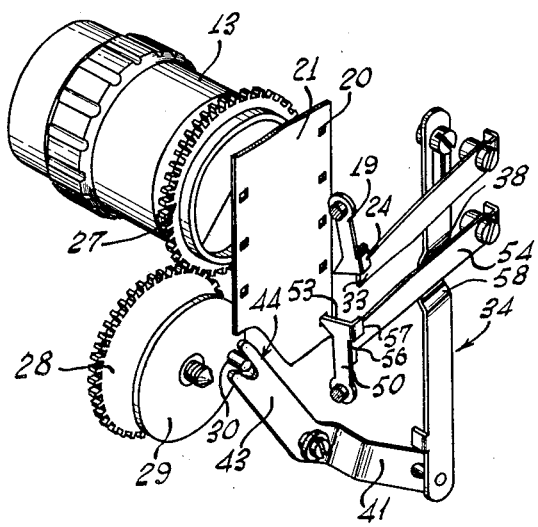
FIGURE 8 is a view similar to FIGURE 7 the fade mechanism being illustrated in a later stage of operation during the reverse winding of the film.

As in the previous embodiment, when the diaphragm aperture is open the arm 34 is in raised position, as seen in FIGURE 7 of the drawings, releasing the pawl 19 to film engaging and forward advancing position and when the aperture is in closed position the arm 34 is depressed to retract the pawl 19 from engagement with the film 21. On the other hand, the film reverse advancing pawl 50 is in a retracted film disengage position when the diaphragm aperture is open by reason of the lower section of the raised arm 34 engaging and urging the resilient arm 54 rearwardly and is in film engage position when the diaphragm aperture is closed by reason of the recess 38 registering with the arm 54 and permitting its forward movement. Thus the forward and reverse pawls 19 and 50 are alternatively in advancing engagement with the film 21 when the diaphragm aperture is open and closed respectively.

In employing the last described embodiment in the production of an overlap sequence, upon the termination of a picture taking sequence the diaphragm aperture is slowly closed to effect a fade-out, the pawl 19 being retracted and the pawl 50 being advanced. The running of the camera motor is continued with the closed diaphragm for a little less than the length of the fade-out sequence, the film being rewound during this interval. The next picture taking sequence is effected by starting the camera motor and slowly opening the diaphragm which retracts the pawl 50 and advances pawl 19 to forward the film and slowly increase the light entering the camera. The amount of overlap is controlled by the amount of film rewind and may be completely eliminated by effecting no film rewind in which case simple fade-outs and fade-ins may be produced as desired.

While there have been described and illustrated preferred embodiments of the present invention, it is apparent that numerous alterations, omissions and additions may be made without departing from the spirit thereof:

What is claimed is:

1. A motion picture camera comprising a variable aperture diaphragm movable between an open and closed position, a film advancing pawl alternatively reciprocable along a first operative film advancing path and a second inoperative path, and a control mechanism coupling said pawl to said diaphragm to restrict the movement of said pawl to said second path when said diaphragm is in said closed position and to release said pawl for movement along said first path when said diaphragm is in said open position.

2. A motion picture camera comprising a shutter, a variable aperture diaphragm movable between an open and closed position, a first film forward advancing element alternatively movable along a first operative film advancing path and a second inoperative path, a second film reverse advancing element selectively movable along the first operative film advancing path and a second inoperative path, and a control mechanism coupling said elements to said diaphragm to release said first element to its said first path and to restrict said second element to its said second path when said diaphragm is in its open position and to release said second element to its said first path and restrict said first element to its said second path when said diaphragm is in its said closed position.

3. The camera of claim 2 wherein said first and second film advancing elements are defined by oppositely sensed pawls.

4. A camera of the character described comprising a diaphragm control ring rotatable between an aperture open and an aperture closed position, a film advancing element alternatively longitudinally reciprocable along a film engaging advance path and the film disengaging retracted path, an abutment member engaging said film advancing element and movable therewith between and along said advanced and retracted paths, and means connecting said abutment member to said diaphragm control ring to urge said abutment member toward a retracted position upon movement of said ring to an aperture closed position.

5. An improved motion picture camera comprising a variable aperture diaphragm movable between an open and closed position, a reciprocating film advancing bar, a first film forward advancing pawl mounted on said bar and alternatively movable between a film engage and film disengage position, a second film reverse advancing pawl mounted on said bar and alternatively movable between a film engage and disengage position, spring means urging said pawls to film engage positions and a control mechanism coupling said diaphragm to said pawls and responsive to said diaphragm open position to maintain said second pawl in film disengage position and responsive to said diaphragm closed position to maintain said first pawl in film disengage position.

6. A camera of the character described comprising a diaphragm control ring rotatable between an aperture open and an aperture closed position, a longitudinally reciprocating film advancing first pawl swingable forwardly to a film engage position and rearwardly to a film disengage position and spring urged toward its film engage position, a lug carried by said pawl, a resilient arm having a movable free end slidably engaging said lug and normally permitting the movement of said pawl to a film engage position, said arm free end being retractable to urge said pawl to a film disengage position, cam means engaging said arm and a coupling connecting said cam means to said diaphragm control ring and actuating said cam means responsive to the closing of said diaphragm control ring to retract said arm free end.

7. A camera in accordance with claim 6 wherein said arm is resilient and said cam means is defined by a bar slidable transversely of and engaging said arm when said diaphragm ring is in closed position to retract said bar, said bar having a recess formed therein registering with said arm when said control ring is in open position to permit the forward movement of said arm free end and said pawl.

8. A camera in accordance with claim 7 wherein said diaphragm control ring is externally toothed and said cam actuating means includes a gear engaging said ring teeth and carrying an eccentrically mounted pin, and a bell crank having a first leg engaging said cam bar and a second leg terminating in a yoke which releasably engages said pin.

9. An improved camera in accordance with claim 6 including a second longitudinally reciprocating film advancing pawl sensed in a direction opposite to said first pawl and swingable forwardly to a film engage position and rearwardly to a film disengage position and spring urged to a film engage position, a second lug carried by said second pawl and a second resilient arm having a movable free end slidably engaging said second lug and normally permitting the movement of said second pawl to a film engage position and being retractable to urge said second pawl to a film disengage position, said cam means urging said arm free ends in opposite directions.

10. A camera in accordance with claim 9 wherein said cam means is defined by a bar slidable transversely relative to said arms and having a recess formed therein alternatively registering with said resilient arms.

References Cited in the file of this patent

UNITED STATES PATENTS

| | | |
|---|---|---|
| 1,892,412 | Steiner | Dec. 27, 1932 |
| 1,960,817 | Kemp et al. | May 29, 1934 |
| 2,080,021 | Wittel | May 11, 1937 |
| 2,117,694 | Becker | May 17, 1938 |
| 2,319,204 | Bolsey | May 18, 1943 |
| 2,702,491 | Favre | Feb. 22, 1955 |
| 2,735,332 | Mihalyi | Feb. 21, 1956 |
| 2,808,756 | Gouffon | Oct. 8, 1957 |